(12) United States Patent
Burtchen et al.

(10) Patent No.: US 10,167,527 B2
(45) Date of Patent: Jan. 1, 2019

(54) METHOD AND ARRANGEMENT FOR PROGRESSIVE SURFACE HARDENING

(71) Applicant: THYSSENKRUPP ROTHE ERDE GMBH, Dortmund (DE)

(72) Inventors: Marco Burtchen, Lippstadt (DE); Mathieu Langels, Erwitte (DE); Bernd Stakemeier, Erwitte (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 1013 days.

(21) Appl. No.: 14/379,022

(22) PCT Filed: Feb. 6, 2013

(86) PCT No.: PCT/EP2013/052331
§ 371 (c)(1),
(2) Date: Aug. 15, 2014

(87) PCT Pub. No.: WO2013/120744
PCT Pub. Date: Aug. 22, 2013

(65) Prior Publication Data
US 2014/0367376 A1    Dec. 18, 2014

(30) Foreign Application Priority Data

Feb. 17, 2012    (DE) .................. 10 2012 101 304

(51) Int. Cl.
*C21D 1/10*      (2006.01)
*C21D 9/40*      (2006.01)
(Continued)

(52) U.S. Cl.
CPC ............. *C21D 1/10* (2013.01); *C21D 9/0062* (2013.01); *C21D 9/40* (2013.01); *C21D 11/00* (2013.01);
(Continued)

(58) Field of Classification Search
CPC ........... Y02P 10/253; C21D 9/40; C21D 1/10; C21D 1/42; C21D 2221/00;
(Continued)

(56) References Cited

U.S. PATENT DOCUMENTS 3,716,690 A    2/1973  Bryant
4,131,490 A *  12/1978 Oishi ................... B21C 51/00
                                                    148/196

(Continued)

FOREIGN PATENT DOCUMENTS

CN      102089447 A    6/2011
DE       2314840 A1   10/1973
(Continued)

OTHER PUBLICATIONS

English Translation JP S558403.*
(Continued)

*Primary Examiner* — Tu B Hoang
*Assistant Examiner* — Vy Nguyen
(74) *Attorney, Agent, or Firm* — Lathrop Gage L.L.P.

(57) ABSTRACT

The invention relates to a method for the progressive induction surface hardening of a closed curve trace of a workpiece, the closed curve trace and a hardening device being moved relative to one another in a feed mode to harden the closed curve trace starting from an initial zone to an end zone, an unhardened soft zone being provided. According to the invention, the workpiece is provided with a marking, the hardening device having a sensor for detecting said marking. The curve trace and the hardening device are moved relative to one another along the treatment direction until the senor detects the marking. Once the marking is detected, another movement takes place in the treatment direction before the hardening device is activated, the curve trace being hardened by the relative movement. The marking is again detected by (Continued)

means of the sensor and the hardening device is then deactivated. The invention also relates to an arrangement which is suitable for carrying out the method described.

5 Claims, 2 Drawing Sheets

(51) Int. Cl.

| | | |
|---|---|---|
| *C21D 11/00* | (2006.01) | |
| *C21D 9/00* | (2006.01) | |
| *H05B 6/06* | (2006.01) | |
| *H05B 6/10* | (2006.01) | |

(52) U.S. Cl.
CPC ............... *H05B 6/06* (2013.01); *H05B 6/101* (2013.01); *C21D 2221/00* (2013.01); *Y02P 10/253* (2015.11)

(58) Field of Classification Search
CPC .... C21D 2221/02; C21D 11/00; C21D 1/667; C21D 9/34; C21D 2221/10; C21D 1/04; C21D 1/09; C21D 1/52; C21D 1/613; C21D 1/62
USPC .............. 219/543, 216, 469, 121.83, 121.61, 219/121.62, 121.63, 121.65, 388, 553, 219/121.66, 121.68, 202, 217, 400, 411, 219/527, 529, 541, 665; 148/511, 512, 148/525, 503; 29/620; 396/575; 399/329, 251; 404/79, 77; 425/110; 430/350; 429/46
See application file for complete search history.

(56) References Cited

U.S. PATENT DOCUMENTS

| | | | | |
|---|---|---|---|---|
| 4,728,761 | A * | 3/1988 | Mucha ..................... | C21D 9/30 148/572 |
| 8,766,150 | B2 | 7/2014 | Zernickel et al. | |
| 2004/0259277 | A1* | 12/2004 | Hofmeister ........... | H01L 23/544 438/14 |
| 2008/0118283 | A1* | 5/2008 | Tsueda ............... | G03G 15/2064 399/333 |
| 2009/0148158 | A1* | 6/2009 | Tsuritani .......... | H04B 10/07953 398/26 |
| 2009/0148185 | A1* | 6/2009 | Kudo ................. | G03G 15/0131 399/167 |
| 2010/0243643 | A1* | 9/2010 | Cesano .................... | C21D 1/10 219/635 |
| 2011/0227822 | A1* | 9/2011 | Shai ....................... | G06F 1/1615 345/156 |

FOREIGN PATENT DOCUMENTS

| | | | | |
|---|---|---|---|---|
| DE | 102005006701 B3 | 3/2006 | | |
| DE | 102005007984 A1 | 8/2006 | | |
| DE | 102006003014 B1 | 10/2007 | | |
| DE | 102008033735 A1 | 2/2010 | | |
| EP | 1988179 A2 * | 11/2008 | ............... | C21D 1/10 |
| JP | S558403 A * | 1/1980 | ............... | C21D 1/10 |
| JP | 2005146316 A | 6/2005 | | |
| JP | 2009287074 A | 12/2009 | | |

OTHER PUBLICATIONS

German Language International Search Report for International Patent Application No. PCT/EP2013/052331; dated Apr. 25, 2013.
English Translation of International Search Report for International Patent Application No. PCT/EP2013/052331; dated Apr. 25, 2013.
English Abstract of German Patent Application No. DE 102005006701.
English Abstract of counterpart publication WO2007082957 to German Patent Application No. DE 102006003014B3.
English Abstract of counterpart publication WO2010006689 to German Patent Application No. DE 102008033735A1.
English Abstract of Japanese Patent JP S558403.
English Translation of International Preliminary Report on Patentability and Written Opinion of the International Searching Authority for PCT/EP2013/052331, dated Aug. 28, 2014.
English translation of abstract of DE 102005007984 A1.
Rollmann, Joerg; Spinty, Wilfried; Stakemeier, Bernd: "Development of new application fields for large roller bearings by developing a new slide way hardening process", ISSN 1612-2763, Jul. 2005 (Jul. 1, 2005), ThyssenKrupp Techforum, pp. 78-83, XP009123763.

* cited by examiner

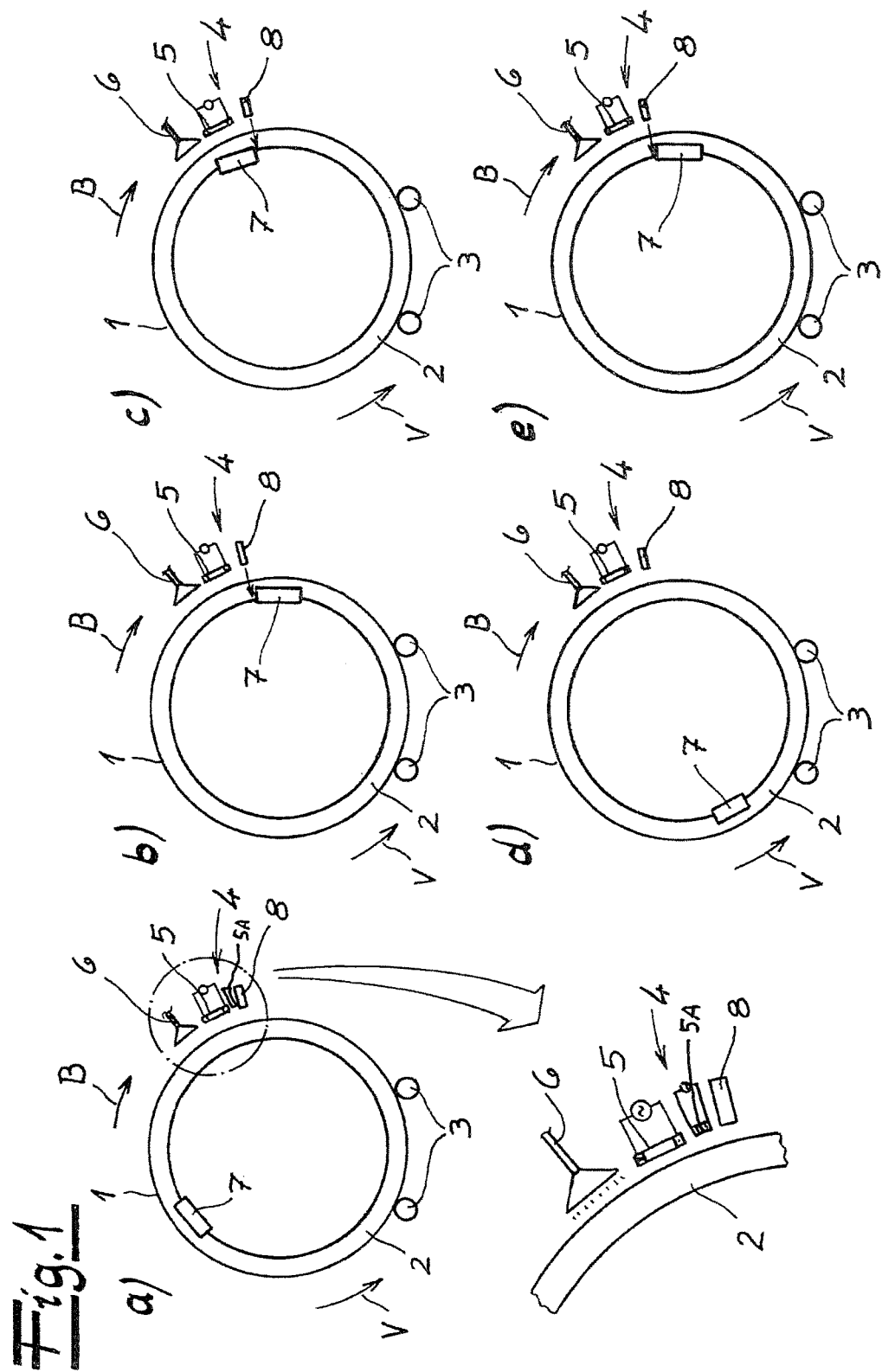

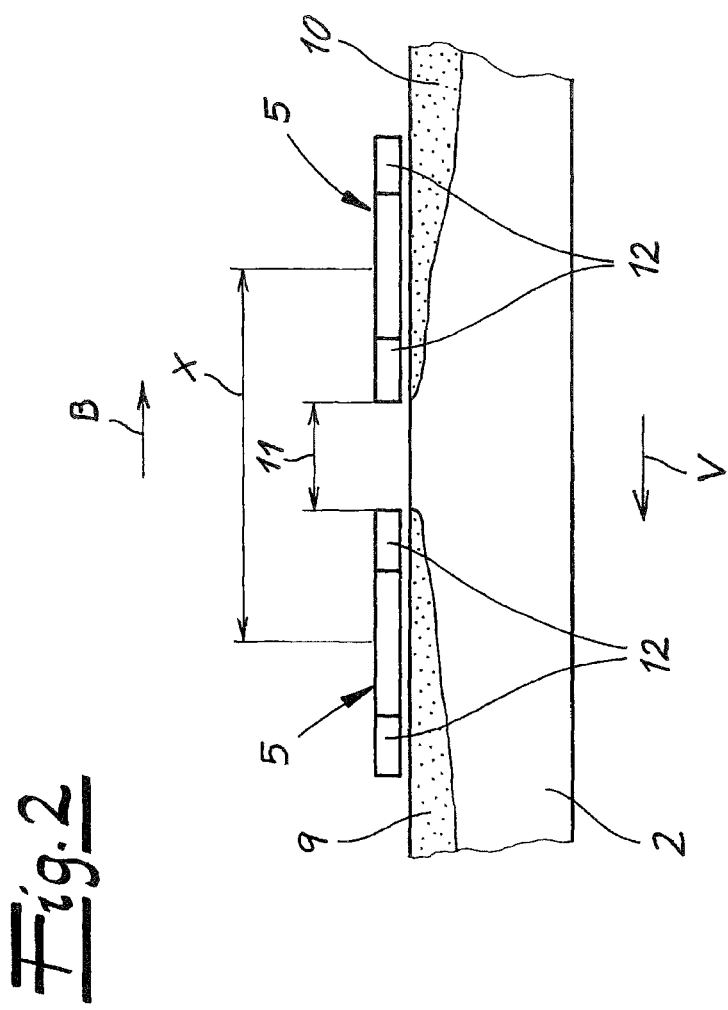

METHOD AND ARRANGEMENT FOR PROGRESSIVE SURFACE HARDENING

CROSS REFERENCE TO RELATED APPLICATIONS

This application is a U.S. National Stage Entry of International Patent Application Serial Number PCT/EP2013/052331, filed Feb. 6, 2013, which claims priority to German National Patent Application Serial Number DE102012101304.7, filed Feb. 17, 2012.

FIELD

The present invention relates to a method for the progressive induction surface hardening of a closed curve trace of a workpiece, particularly a running surface of a bearing ring, the closed curve trace and a hardening device, which has an inductor and a spray, being moved relative to one another in a direction of treatment in a feeding mode, in order to harden the closed curve trace from an initial zone to an end zone, and an unhardened slip zone being provided between the initial zone and the end zone.

BACKGROUND

The surface to be hardened is strongly heated under the hardening device by the inductor subjected to alternating current. Arranged downstream of the inductor in the direction of treatment is a spray, from which a cooling fluid is applied to the previously heated-up surface for quenching. With the materials that are usually used, an austenite that is as homogeneous as possible is produced in a surface layer by the heating, as high a proportion as possible of martensite then being formed by the quenching at a high cooling rate. The effective depth of hardening depends in this case on the temperature distribution in the surface layer and can be changed during the induction hardening, for example by means of the frequency, which may particularly lie between 3 kHz and 8 kHz, and the power output.

In order to harden the closed curve trace, for example a running surface of a bearing ring, the curve trace may be moved continuously past a fixed hardening device. Equally, however, the workpiece may remain at rest, while the hardening device is moved along the surface to be hardened. In principle, there is also the possibility of clamping the workpiece on a support.

In the case of bearing rings for large rolling bearings, a method in which the bearing ring is moved past a fixed hardening device has proven successful. In particular, the bearing ring may be arranged vertically or at an angle, the movement of the bearing ring then being able to take place by means of supporting rollers.

In principle, there is the problem that already hardened regions must not be heated again to a temperature at which the hardness properties are lost again. In the case of a closed curve trace, for example a running surface of a bearing ring, an unhardened slip zone is therefore provided between an initial zone, at which the hardening is begun, and an end zone, which is hardened last. The unhardened slip zone typically has a width of between 10 mm and 20 mm, it being known in the case of rolling bearings to relief-grind the slip zone, in order that the rolling bodies do not have bearing contact there.

SUMMARY

In order to produce a slip zone with a given width, the position of the hardening device with respect to the surface to be hardened must be known when switching on and off the power output of the hardening device. Usually, a suitable length of the slip zone on a component is determined on the basis of oriented trials, the corresponding parameters for controlling a drive and the hardening device then being transferred to the further workpieces.

However, it must be taken into account in this respect that, in the case of the then-following workpieces, the width of the slip zone may vary on account of disturbing influences. Firstly, the workpieces are subject to certain tolerances, and so, for example, slightly differing diameters of a bearing ring may also have the effect that a differing path of the hardening device along the running surface is obtained. In addition, the heating by means of the hardening device causes the workpiece to expand, variations in the thermal expansion also possibly leading to a differing length of the slip zone. Finally, there is the problem that inaccuracies may also occur in the driving of the hardening device or of the workpiece. If, for example, a bearing ring in a vertical arrangement is supported on its underside on rollers and is driven by the rollers, slipping between the rollers and the bearing ring also leads to a deviation if the position of the bearing ring is deduced from the rotational speed or the rotational position of the rollers.

The documents DE 10 2005 006 701 B3, DE 10 2006 003 014 B1 and DE 10 2008 033 735 A1 disclose methods for induction surface hardening of a ring surface of a workpiece. In the case of this method, a slip zone is avoided or reduced by using two inductors, which are moved counter to one another, starting from an initial zone. The initial zone can in this case be hardened completely, because uniform heating, or at least largely uniform heating, can be achieved by the two inductors. The two inductors are then moved counter to one another and finally come together at the end zone, which on the ring surface lies opposite the initial zone. The end zone is also heated only once, when the two inductors approach one another from both sides. Since the two inductors cannot be brought up unrestrictedly close to one another, the end zone may be initially preheated with a supplementary inductor. A disadvantage of the methods described is that, particularly in the case of large rolling bearings, very considerable expenditure is necessary with regard to the hardening device with counter-running inductors.

The present invention is based on the object of providing a method for the progressive induction surface hardening of a closed curve trace of a workpiece in which a preset value for the width of an unhardened slip zone can be maintained with a high degree of accuracy even in the case of large workpieces.

BRIEF DESCRIPTION OF THE DRAWINGS

The present disclosure is described in detail below with reference to the attached drawing figures, wherein:

FIGS. 1a-1e are schematic diagrams depicting an embodiment of an apparatus, and various steps in an embodiment of a method, for the progressive surface hardening of a running surface of a bearing ring, as disclosed herein.

FIG. 2 is a partial side section view depicting a region in the running surface of a surface hardened bearing ring of FIG. 1 in which the hardening operation is begun and ended, and has an unhardened slip zone remaining between an initial zone and an end zone thereof.

DETAILED DESCRIPTION

To achieve this object, it is provided on the basis of the method for progressive surface hardening described at the beginning that a marking that is fixed in place with respect to the workpiece is applied, the hardening device has a sensor for sensing the marking, the closed curve trace and the non-active hardening device are moved relative to one another along the direction of treatment until the sensor senses the marking, after the sensing of the marking by the sensor a further movement takes place in the direction of treatment before the hardening device is activated, after that the curve trace is hardened by the relative movement between the curve trace and the active hardening device in the feeding mode, and the marking is sensed once again by means of the sensor and then the hardening device is deactivated directly or with a delay. According to the invention, a direct determination of the position of the workpiece takes place. In particular, the marking is sensed twice, in order to be able to fix the beginning and the end of the hardening operation. It must be taken into account in this respect that the unhardened slip zone must be left free between the beginning and the end of the hardened surface. It is therefore provided that, after the first sensing of the marking by the sensor, firstly a further movement takes place in the direction of treatment before the hardening device is activated. The width of the slip zone is obtained indirectly from the path of this further movement. In this case, however, the width of the heating device, that is to say in the case of inductive heating the width of an inductor, must usually also be taken into account.

The path covered after the first sensing of the marking by the sensor before the activation of the hardening device may be controlled by a time delay or be determined with the aid of the driving device. Since this additional path is small in comparison with the overall length of the closed curve trace, the disturbing factors such as slipping of the drive, dimensional deviations or differing thermal expansions play only a subordinate role. Particularly accurate and reliable controlling of the hardening operation is possible however if, on the first sensing of the marking, seen in the direction of treatment, the beginning and the end of the marking are detected, the hardening device being activated when the end of the marking is detected. The deactivation of the hardening device then expediently takes place on renewed sensing of the marking, when the beginning of the marking is detected. Such a procedure allows any disturbing influences to be ruled out completely. In addition, very simple control of the method can be realized.

The hardening device has an inductor, which is subjected to an alternating current during the hardening of the curve trace, the hardening device also having a spray, arranged downstream of the inductor in the direction of treatment, for quenching. In particular, a supplementary inductor 5A may also be arranged as a preheater upstream of the inductor in the direction of treatment.

In order to make easy handling possible, especially in the case of large workpieces, for example bearing rings of large rolling bearings, the hardening device may be arranged such that it is fixed in place, the closed curve trace of the workpiece being moved past the hardening device by a drive. As already explained above, arrangements that have proven successful in the case of bearing rings are arrangements in which the bearing rings in a vertical arrangement, or an arrangement tilted slightly with respect to the vertical, are supported on their underside on rollers, it also being possible for the bearing ring that is to be treated to be turned by means of the rollers.

According to the invention, the marking is applied such that it is fixed in place with respect to the workpiece. This means that the relative position of the marking does not change with respect to the workpiece during the hardening operation. Thus, the marking may be applied directly to the workpiece. If, however, the workpiece is for example drawn onto a support, the marking may also be fixed to the support.

Dark surfaces, notches or the like on the workpiece or on a support receiving the workpiece may be provided for example as the marking. Particularly preferred, however, is a configuration in which the marking is detachably fixed to the workpiece as a separate part. Possible, for example, is a clamping fixing or, depending on the material, also a magnetic fixing. This provides the advantage that, in the case of the production of multiple workpieces, such a marking can be removed from the previous workpiece and placed onto the next-following workpiece. Inadequate or incorrect marking is thereby ruled out.

The sensing of the marking may for example take place optically, in particular by means of a light barrier. In the case of a marking placed on as a separate part, however, mechanical sensing is also possible, this being particularly reliable, especially even under very harsh operating conditions. The sensor is then formed as a kind of feeler that can establish the presence of the marking.

The subject matter of the invention also includes an arrangement for the progressive induction surface hardening of a closed curve trace of a workpiece that is suitable especially for carrying out the previously described method. The arrangement comprises a hardening device, which has an inductor and a spray, and a drive for the relative movement between the workpiece and the hardening device. According to the invention, the hardening device comprises a sensor for sensing a marking applied such that it is fixed in place with respect to the workpiece, preferably applied to the workpiece.

The invention is explained below on the basis of a drawing, which merely represents an exemplary embodiment and in which:

FIG. 1a shows an arrangement for the progressive surface hardening of a closed curve trace 1 of a workpiece 2. In the specific exemplary embodiment, the running surface of a bearing ring is to be hardened, the annular workpiece 2 being aligned vertically, or substantially vertically, and supported on its underside on rollers 3. At least one of the rollers 3 is driven by a motor (not represented), and so the annular workpiece 2 can be turned about its circumference.

The arrangement also comprises a hardening device 4 for induction hardening, which has an inductor 5 and a spray 6, arranged downstream of the inductor 5 in the direction of treatment B. The direction of treatment B denotes the direction in which the hardening operation proceeds. Correspondingly, in the case of the described movement of the workpiece 2 with a fixed hardening device 4, the direction of treatment B is counter to the direction of feeding V.

It can also be seen from FIG. 1a that a marking 7 is arranged on the workpiece 2 as a separate part.

FIG. 1a shows the workpiece 2 directly after placement on the rollers 3, the hardening device 4 still being inactive.

The workpiece 2 is then turned further in the direction of feeding V, until the marking reaches the hardening device 4. The hardening device 4 comprises a sensor 8, which senses the marking 7. In the exemplary embodiment represented, the sensor 8 detects both the beginning (FIG. 1b) and the end of the marking 7 (FIG. 1c), the hardening device 4 only being activated when the sensor 8 has detected the end of the marking 7. The closed curve trace 1 of the workpiece 2 is then hardened in a uniform feeding mode (FIG. 1d), until the marking 7 once again reaches the sensor 8 (FIG. 1e). The hardening device 4 with the inductor 5 is then deactivated.

According to FIG. 2, a slip zone 11 remaining between an initial zone 9 and an end zone 10 can be set with a high degree of accuracy and reproducibility by the marking 7. For purposes of illustration, the position of the inductor 5 is represented at the beginning of hardening in the initial zone 9 and at the end of hardening in the end zone 10. The width x of the marking corresponds here to the distance between the starting position and the end position of the inductor. It must be taken into account in this respect that the inductor usually has a conductor loop with two parallel conductor portions 12. The width of the unhardened slip zone 11 in this case corresponds approximately to the width x of the marking 7 less the width of the inductor 5. An optimum width of the marking 7, and consequently of the slip zone 11, can be obtained on the basis of oriented trials. According to the invention, a given width of the slip zone 11 can be maintained with a very high degree of accuracy and reproducibility. It is also indicated in FIG. 2 that the effective hardening depth and the hardness at the initial zone 9 and the end zone 10 respectively decrease in the direction of the slip zone 11.

The invention claimed is:

1. A method for a progressive induction surface hardening of a closed curved trace of a workpiece by a hardening device, comprising:
   providing:
      a hardening device having:
         an inductor configured to heat the workpiece to harden a surface thereof;
         a sprayer configured to quench the heated workpiece; and
         a sensor configured to sense a position of the workpiece with respect to the inductor; and
      the workpiece;
      wherein the workpiece is aligned vertically and is supported on an underside by rollers, wherein at least one of the rollers is driven by a motor; and
      wherein the hardening device and workpiece are movable relative to one another in a direction of treatment when in a feeding mode;
   applying a marking to the workpiece, the marking being detachable from the workpiece;
   moving the closed curved trace of the workpiece and the hardening device relative to each other along a direction of treatment of the closed curved trace, while the hardening device is deactivated;
   sensing the marking by the sensor of the hardening device as the marking moves to a predetermined position adjacent the sensor;
   after said sensing of the marking, further moving the closed curved trace of the work piece and the hardening device relative to each other along the direction of treatment while the hardening device is still deactivated;
   detecting, upon a sensing of the marking by the sensor, each of the beginning and end of the marking, as the closed curved trace and sensor move relative to each other along the direction of treatment; and
   activating the hardening device when the end of the marking is detected during a first sensing of the marking at an initial zone of the closed curved trace;
   moving the closed curved trace of the workpiece and the hardening device relative to each other along the direction of treatment of the closed curved trace while the hardening device is activated, such that unhardened portions of the closed curved trace become hardened as the hardening device moves thereby; and
   deactivating the hardening device when the beginning of the fixed mark is detected during a second sensing of the marking at an end zone of the closed curved trace when the marking is sensed a second time by the sensor, such that the hardening device hardens the surface of the closed curved trace from the initial zone to the end zone along the direction of treatment, and leaving an unhardened slip zone disposed between the initial zone and the end zone, wherein the width of the unhardened slip zone corresponds to the width of the marking.

2. The method of claim 1, further comprising: preheating the closed curved trace by a supplementary inductor disposed upstream of the inductor in the direction of treatment.

3. The method of claim 1, wherein the hardening device is fixed in place and the closed curved trace of the workpiece is moveable past the hardening device by a drive.

4. An apparatus for a progressive induction surface hardening of a closed curved trace of a workpiece, comprising:
   a hardening device including,
      an inductor configured to heat a surface of the workpiece so as to harden the surface upon application of a quenching fluid to the heated surface of the workpiece,
      a sprayer spaced a predetermined distance from said inductor and configured to spray quenching fluid at the induction heated surface of the workpiece, and
      a sensor in communication with said hardening device and configured to detect a fixed marking applied to the workpiece for determining the position of the workpiece relative to the hardening device; and
   a drive configured to move one of the hardening device or workpiece relative to the other;
   wherein the workpiece is aligned vertically and is supported on an underside by rollers, wherein at least one of the rollers is driven by a motor;
   wherein the hardening device and workpiece are movable relative to one another in a direction of treatment when in a feeding mode;
   the drive moves the closed curved trace of the workpiece and the hardening device relative to each other along a direction of treatment of the closed curved trace, while the hardening device is still deactivated;
   wherein the sensor of the hardening device senses the fixed marking as the fixed marking moves to a predetermined position adjacent the sensor;
   after the sensor senses of the fixed marking, the drive further moves the closed curved trace of the work piece and the hardening device relative to each other along the direction of treatment while the hardening device is still deactivated;
   wherein the sensor detects each of the beginning and end of the fixed marking upon a sensing of the fixed marking, as the closed curved trace and sensor move relative to each other alone the direction of treatment; and
   when the sensor detects the end of the fixed marking during a first sensing of the fixed marking, the hardening device is activated at an initial zone of the closed curved trace;
   the drive moves the closed curved trace of the workpiece and the hardening device relative to each other along the direction of treatment of the closed curved trace while the hardening device is activated, such that unhardened portions of the closed curved trace become hardened as the hardening device moves thereby; and when the sensor detects the beginning of the fixed marking during a second sensing of the fixed marking, the hardening device is deactivated at an end zone of the closed curved trace, such that the hardening device hardens the surface of the closed curved trace from the initial zone to the end zone along the direction of treatment, and leaving an unhardened slip zone disposed between the initial zone and the end zone, wherein the width of the unhardened slip zone corresponds to the width of the fixed marking.

5. An apparatus for a progressive induction surface hardening of a closed curved trace of a workpiece, comprising:
   a hardening device including,
      an inductor configured to heat a surface of the workpiece so as to harden the surface upon application of a quenching fluid to the heated surface of the workpiece,
      a sprayer spaced a predetermined distance from said inductor and configured to spray quenching fluid at the induction heated surface of the workpiece, and
      a sensor in communication with said hardening device and configured to detect a marking detachably applied to the workpiece for determining the position of the workpiece relative to hardening device; and
   a drive configured to move one of the hardening device or workpiece relative to the other;
   wherein the hardening device and workpiece are movable relative to one another in a direction of treatment when in a feeding mode;
   wherein the drive moves the closed curved trace of the workpiece hardening device relative to each other along a direction of treatment of the closed curved trace, while the hardening device is deactivated;
   wherein the sensor of the hardening device senses the marking as the marking moves to a predetermined position adjacent the sensor;
   after the sensor senses the marking, the drive further moves the closed curved trace of the work piece and the hardening device relative to each other along the direction of treatment while the hardening device is still deactivated;
   wherein the sensor detects each of the beginning and end of the marking, upon a sensing of the marking, as the closed curved trace and sensor move relative to each other along the direction of treatment; and
   when the sensor detects the end of the marking during a first sensing of the marking, the hardening device is activated at an initial zone of the dosed curved trace;
   the drive moves the closed curved trace of the workpiece and the hardening device relative to each other along the direction of treatment of the closed curved trace while the hardening device is activated, such that unhardened portions of the closed curved trace become hardened as the hardening device moves thereby; and
   when the sensor detects the beginning of the marking during a second sensing of the marking, the hardening device is deactivated at an end zone of the closed curved trace, such that the hardening device hardens the surface of the closed curved trace from the initial zone to the end zone along the direction of treatment, and leaving an unhardened slip zone disposed between the initial zone and the end zone, wherein the width of the unhardened slip zone corresponds to the width of the marking.

* * * * *